United States Patent [19]
Gales et al.

[11] Patent Number: 4,744,895
[45] Date of Patent: May 17, 1988

[54] REVERSE OSMOSIS WATER PURIFIER

[75] Inventors: Michael A. Gales, New York, N.Y.; Stanley I. Magidson, Morristown, N.J.; John Wistrand, New Canaan, Conn.; Donald B. Guy, Park Ridge, N.J.

[73] Assignee: Aquasciences International, Inc., Lincoln Park, N.J.

[21] Appl. No.: 796,296

[22] Filed: Nov. 8, 1985

[51] Int. Cl.⁴ .............................................. B01D 13/00
[52] U.S. Cl. .................. 210/96.2; 210/257.2; 210/321.69; 210/416.1
[58] Field of Search .................. 210/137, 433.2, 416.3, 210/409, 416.1, 96.2, 257.2, 321.69; 137/562, 625.17, 625.48; 251/205, 208, 120

[56] References Cited

U.S. PATENT DOCUMENTS

| | | | |
|---|---|---|---|
| 2,987,187 | 6/1961 | Comroe | 210/244 |
| 3,342,335 | 9/1967 | Gamundi et al. | 210/117 |
| 3,428,089 | 2/1969 | Kachergis | 137/625.29 |
| 3,444,890 | 5/1969 | Ralston | 137/562 |
| 3,456,803 | 7/1969 | Rak | 210/177 |
| 3,633,748 | 1/1972 | Hanley | 210/97 |
| 3,799,344 | 3/1974 | Nishizawa | 210/96 |
| 3,838,774 | 10/1974 | Dolan et al. | 210/85 |
| 4,049,550 | 9/1977 | Obidniak | 210/433.2 X |
| 4,218,317 | 8/1980 | Kirschmann | 210/117 |
| 4,556,484 | 12/1985 | Hunter et al. | 210/416.3 X |

Primary Examiner—Frank Spear
Attorney, Agent, or Firm—Gregor N. Neff

[57] ABSTRACT

A compact reverse-osmosis water purifier especially adapted for use in the household on a counter-top, with an easy-to-operate diverter valve to connect the purifier to a water faucet and sink. A battery-operated pump is provided to dispense water from a storage reservoir. This reduces the size of the purifier unit while maximizing the height from the dispensing spout to the counter-top to accommodate relatively tall vessels for receiving the dispensed water. An automatic conductivity test device causes a red or a green lamp to be lit each time a button is pressed to dispense water, the green lamp indicating that the water is of sufficient purity, and the red lamp indicating that it is not, or that the device is malfunctioning or requires flush cleaning. The diverter valve can be operated to selectively pass water through the faucet in the usual way, or to feed water to the purifier. When in the condition to feed water to the purifier, outlet openings of different diameters can be selected, by operation of a rotary valve, to condition the diverter either for normal operation or for flushing the purifier.

20 Claims, 4 Drawing Sheets

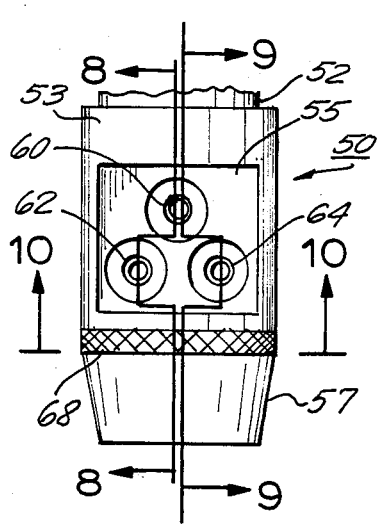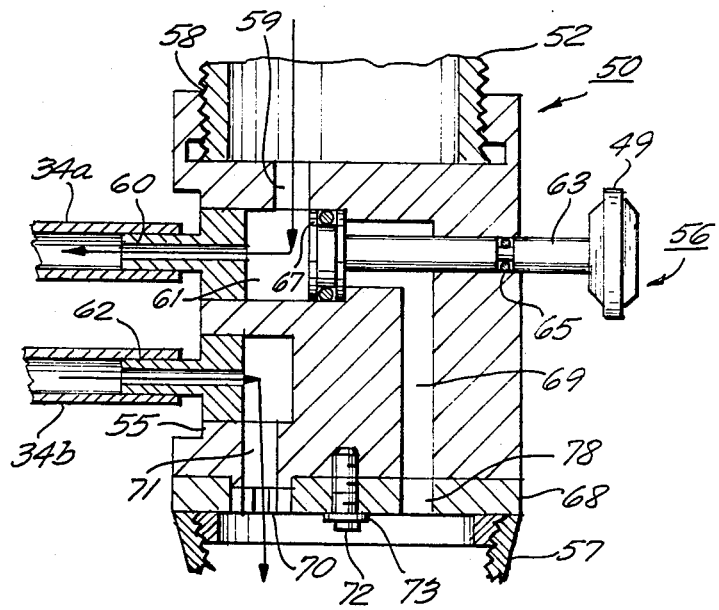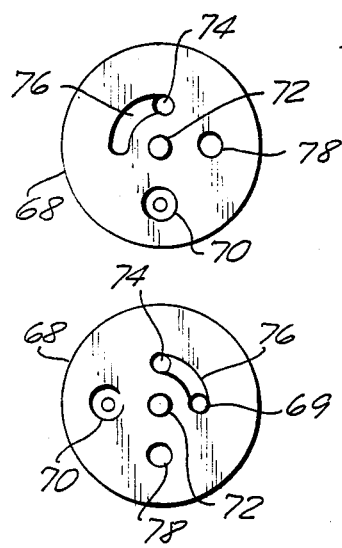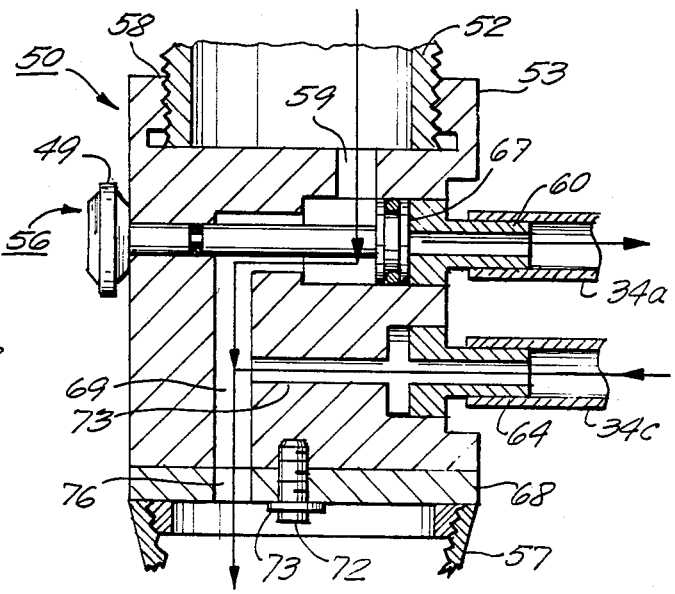

REVERSE OSMOSIS WATER PURIFIER

This invention relates to water purifiers and methods, and particularly to reverse osmosis water purifiers and methods. Even more particularly, the invention relates to reverse osmosis water purifiers of the compact, movable type adapted to rest on the counter-top in the kitchen of a dwelling and to be attached to a water faucet to supply water to be purified.

The reverse osmosis water purification process has many advantages for use in the purification of water for drinking, cooking, etc., both at the municipal level and in the home, as well as in businesses and industrial locations. The process removes most salts, hydrocarbons and other contaminants, and it is capable of providing water with a high degree of purity.

Two major types of reverse osmosis water purifiers currently are being sold for home use; one, which usually fits underneath the kitchen sink, is fixed in place and relatively large in size, and is relatively expensive and difficult to get to for servicing. It is connected to the household water lines with a permanent connection.

Another type of home reverse osmosis unit is smaller, movable, and is adapted to rest on top of the counter in a kitchen, for example, and to be connected detachably to the faucet in the kitchen sink to receive water to be purified. Such a unit is smaller and less expensive to manufacture and install than the under-the-counter unit, and can be moved easily from one location to another.

One of the problems with many prior counter-top reverse osmosis water purifiers is that they ar undesirably large. This tends to make them less desirable to use because of the amount of counter-top space they occupy, and because they are excessively tall and broad.

Another problem with many prior counter-top reverse osmosis water purifiers is that the water dispensing spigot is located near the bottom of the water reservoir in the unit, just a relatively short distance above the counter-top, so that only relatively shallow containers can be placed underneath the dispensing spigot while resting on the countertop. This makes the purifiers relatively cumbersome and difficult to use.

Another problem with such prior devices is that the user has no easily visible, simple means of determining whether or not the purifier unit is working. Additionally, he has no simple, readily visible indication as to the purity of the water that has been dispensed, or as to the need for flushing or replacing the reverse osmosis membrane, or replacing one of the filters, or the need for repair of the unit.

Another problem with prior reverse-osmosis devices designed to rest on a counter-top is that the device used to attach the hose to the water faucet to deliver water to the purifier is relatively difficult to use. The device often requires one to couple and uncouple it with the faucet frequently, and requires the relatively skillful manipulation of a needle valve.

Accordingly, it is an object of the present invention to provide a water purification unit which overcomes or greatly alleviates the foregoing shortcoming of prior art devices. Particularly, it is an object of the invention to provide a compact, relatively simple and inexpensive counter-top reverse osmosis water purification method and purifier which is relatively easy to use.

In accordance with the present invention, the foregoing objects are met by the provision of a counter-top reverse osmosis water purifier in which a pump is provided to dispense water from the purified water reservoir. Preferably, the pump is an electric pump, driven by batteries. Also preferably, the unit is relatively compact, but has a dispenser spout near the top of the unit. Thus, the unit provides a relatively great height between the dispensing spout and the counter-top or other surface on which the unit rests and allows one to place relatively tall vessels underneath the dispensing spout on the counter-top, without making the unit unduly tall.

In accordance with another feature of this invention, an automatic conductivity test is performed each time a switch is depressed to operate the pump to dispense water. The conductivity test device indicates the conductivity of the water being dispensed, and thus provides a measure of its purity. Preferably, means are provided to indicate whether the conductivity is above or below a level selected to provide a line of demarcation between water of acceptable purity and unacceptable purity. Preferably, a red lamp lights when the conductivity is too high, indicating that the water has too many impurities, and a green lamp lights when the conductivity is below the pre-set level. If the red lamp is lit, the operator knows that either he or she must replace one of the filters in the unit, or must flush the membrane of the reverse osmosis unit, or replace the membrane itself, or have the unit repaired.

The provision of a lamp which lights up each time the switch is operated to dispense water serves the valuable additional purpose of indicating to the operator that the unit is functioning.

Preferably, the dispensing switch and the indicator lamps are provided at the top of the unit where they are easy to reach and see.

The purifier unit is made relatively easy to assemble and disassemble for cleaning and service. The reservoir slides into a housing. A separate cover and a separate pump and battery mounting unit are provided. Each fits neatly with the other parts so as to make them easier to take apart without the use of any tools.

Preferably, a prefilter is provided to filter out large solid particles before the impure water reaches the reverse osmosis membrane, and a charcoal post filter is provided to filter the product water discharged by the reverse osmosis unit so as to ensure good taste and odor.

A float valve in the reservoir is used to turn off the water supply when the reservoir is full, thus saving water as compared with some prior art devices.

A diverter valve unit is provided for attachment to a faucet. The valve has one element which can be operated to selectively either allow tap water to pass straight through into the sink, for normal domestic uses of the sink and faucet, or to feed water to the water purifier unit. The diverter valve unit has a second member which can be adjusted to provide a drain outlet from the purifier with either a large size for flushing the membrane, or a small size to provide back-pressure for normal operation of the purifier. A difficult-to-use needle valve is not necessary.

The foregoing and other objects and advantages of the invention will be set forth in or apparent from the following description and drawings.

In the drawings:

FIG. 7 is a side elevation view of the diverter valve of the present invention;

FIGS. 8 and 9 are cross-sectional views taken, respectively, along lines 8—8 and 9—9 of FIG. 7; and FIGS. 10 and 11 are views taken along line 10—10 illustrating two different positions of one valve member of the diverter valve.

GENERAL DESCRIPTION

Figure 1:
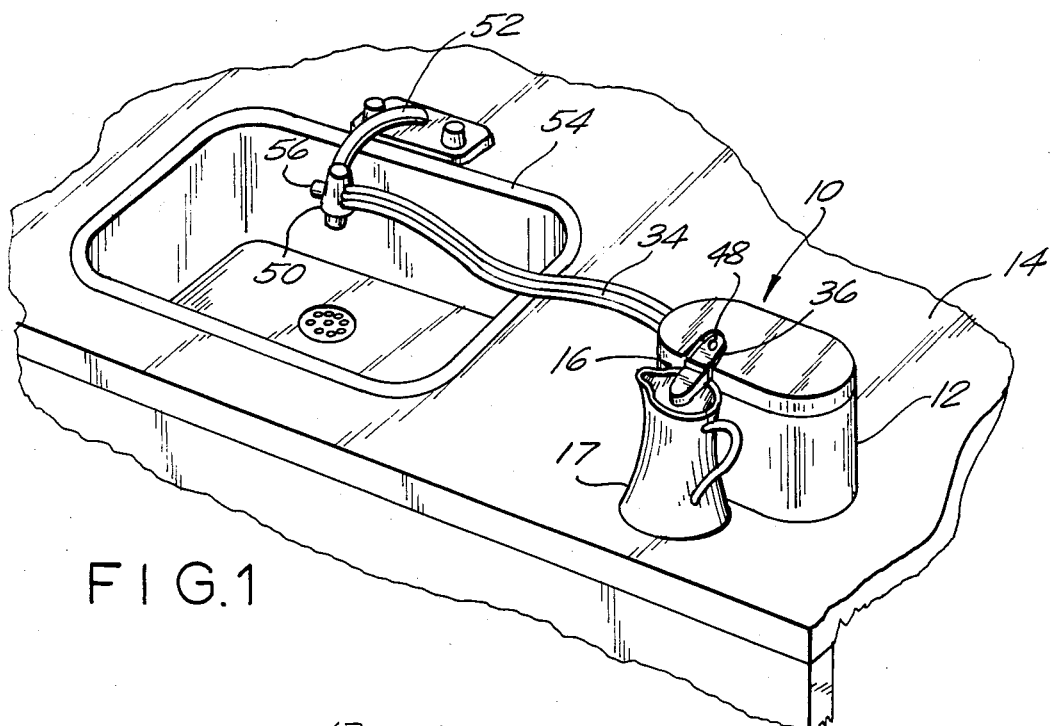
FIG. 1 is a perspective, partially broken away view of kitchen counter-top and sink with a reverse osmosis water purifier of the present invention connected to the faucet and in operating position.

FIG. 1 shows a water purifier unit 10 of this invention connected through hoses 34 to the faucet 52 of a kitchen sink 54. The purifier unit 10 rests on the countertop 14 in which the sink is mounted. A water flow diverter device 50 is connected onto the end of the faucet 52 and the hoses. The purifier 10 has a water dispensing spout 16, and a relatively tall pitcher 17 is shown resting on the countertop 14 underneath the dispensing spout. This demonstrates one of the advantages of the invention; namely, that relatively tall vessels can be placed beneath the dispensing spout and on the counter-top, thus making the purifier unit much easier to use than prior units in which the dispensing spout is located at the bottom of the unit to take advantage of gravity in dispensing water.

PURIFIER UNIT

Referring now to FIGS. 2, 3, 4 and 6 of the drawings, the purifier unit 10 includes a housing 12 resting on the countertop 14. The spout 16 has an outlet opening 18 located near the top of the unit. The purifier unit also includes a pure water storage tank or reservoir 20, and a pump 22 driven by an electric motor 24. The bottom wall of the tank 20 is shown at 26.

The unit 10 also includes a pre-filter 28, a charcoal post-filter 30, and a reverse-osmosis membrane module 32.

In operation, water from the kitchen sink faucet 52 (FIG. 1) or other source of water to be purified is fed through feed hose 34a (FIGS. 4 and 6) into the purifier through a float valve 40 (FIG. 3 and 6) to the pre-filter 28. The water then flows to the membrane unit 32, and from the membrane unit 32 through the post-filter 30 and a stand-pipe 42 into the water tank 20.

The pre-filter 28 filters out solids; the reverse osmosis membrane unit 32 removes salts, hydrocarbons, bacteria, etc.; and the charcoal post-filter filters out any remaining bad-taste/odor-producing substances. The resulting water has excellent taste and purity.

Figure 3:
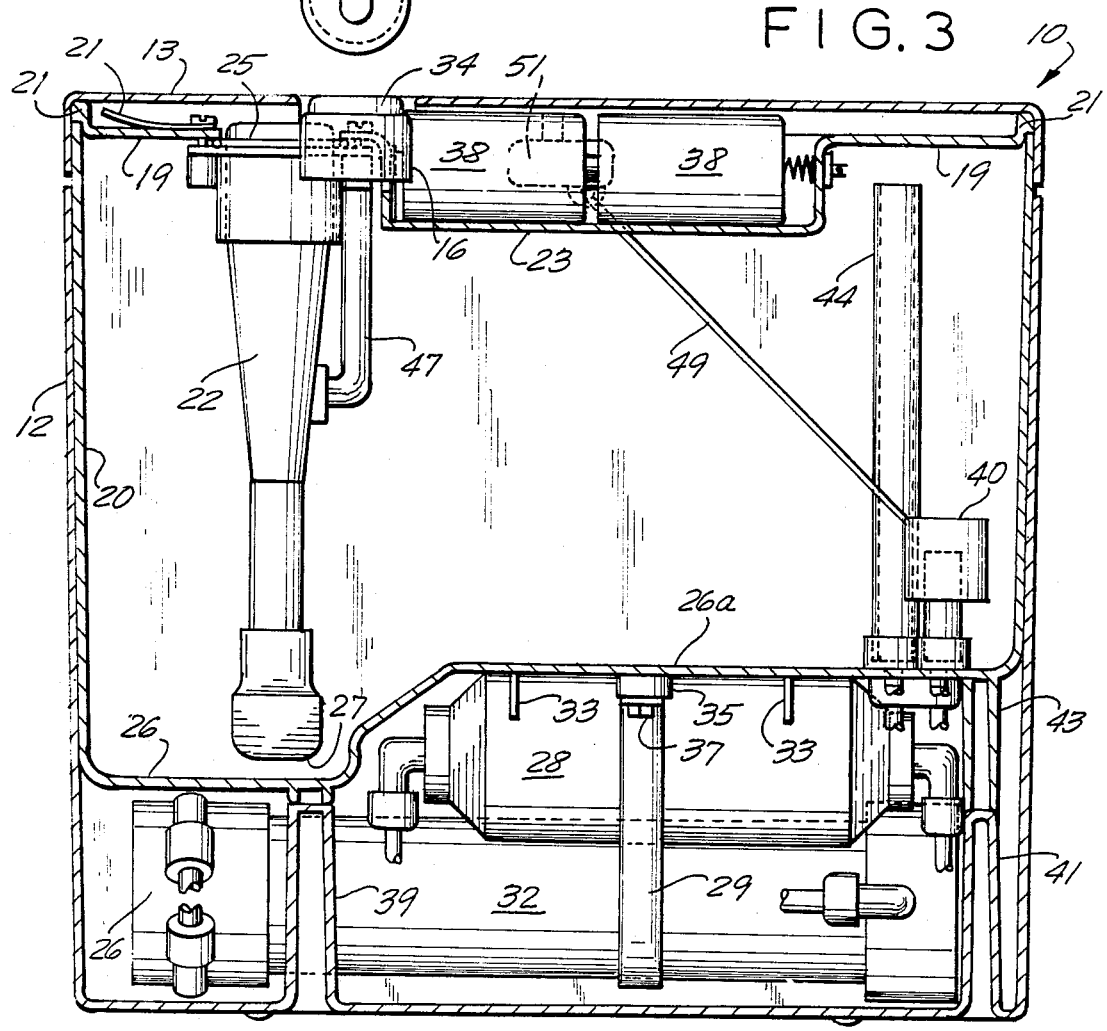
FIG. 3 is a side elevation view, partially in cross-section, of the unit shown in FIGS. 1 and 2.
Figure 6:
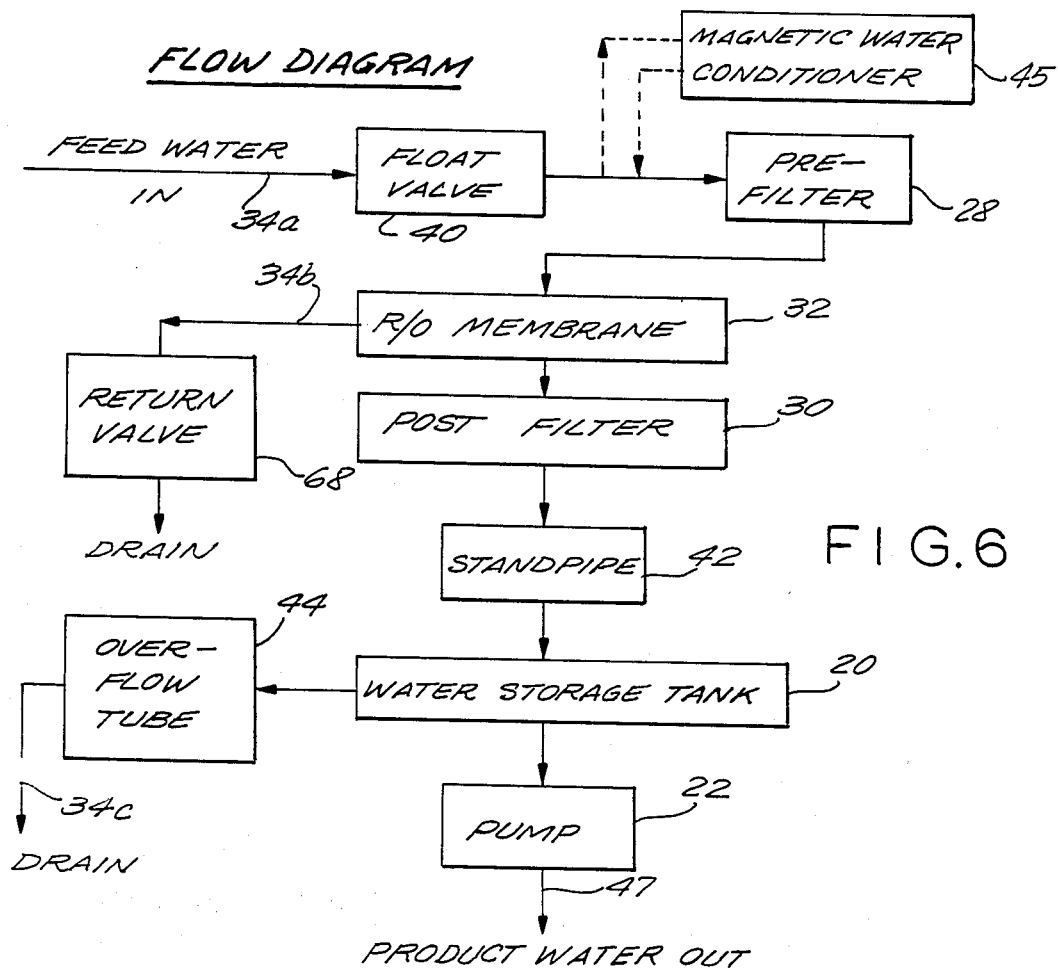
FIG. 6 is a schematic flow diagram showing the water flow through the purifier unit of FIGS. 1-3.

As it is shown in FIGS. 3 and 6, an optional magnetic lime-scale reducer 45 is connected between the float valve 40 and the pre-filter 28 to further condition the water, if desired.

The reverse osmosis process is a relatively slow process. Therefore, the unit 10 usually must be left unattended for a substantial length of time in order to fill the tank. The float valve 40 is provided in order to shut off the inlet water when the tank 20 is full. If the float valve malfunctions, a spill-tube 44 is provided to drain the excess water out of the unit through a drain hose 34c to the sink 54 (FIG. 1).

Figure 2:
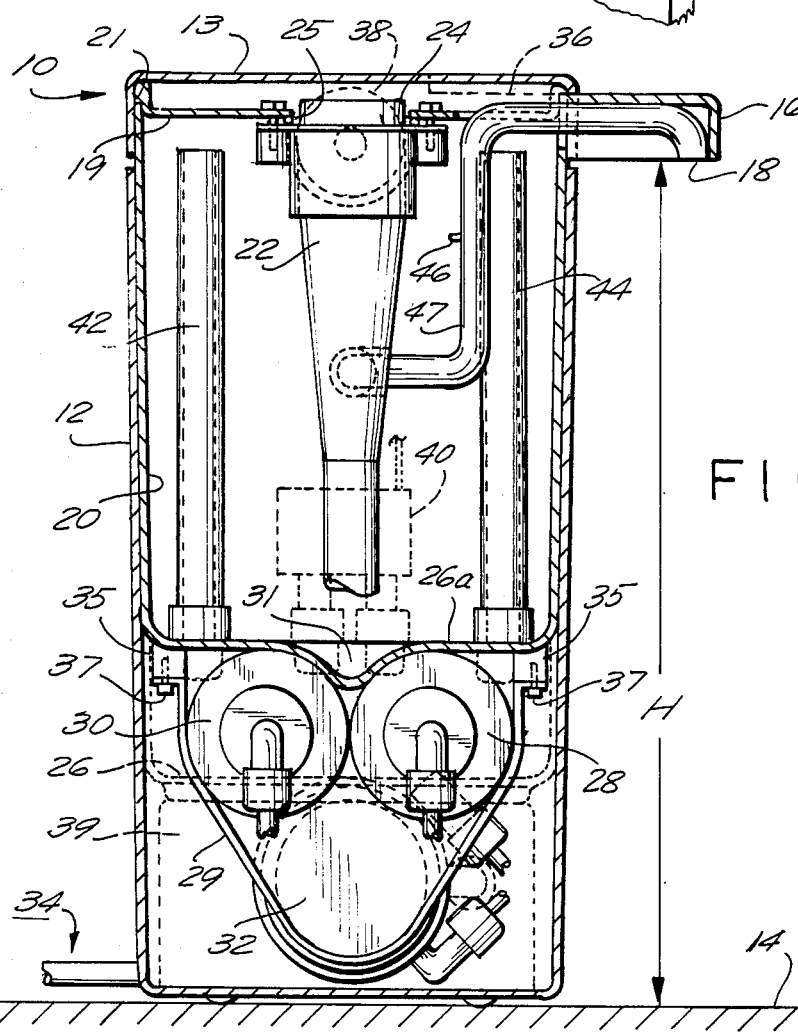
FIG. 2 is an end elevation view, partially in cross-section, of the water purifier unit shown in FIG. 1.
Figure 4:
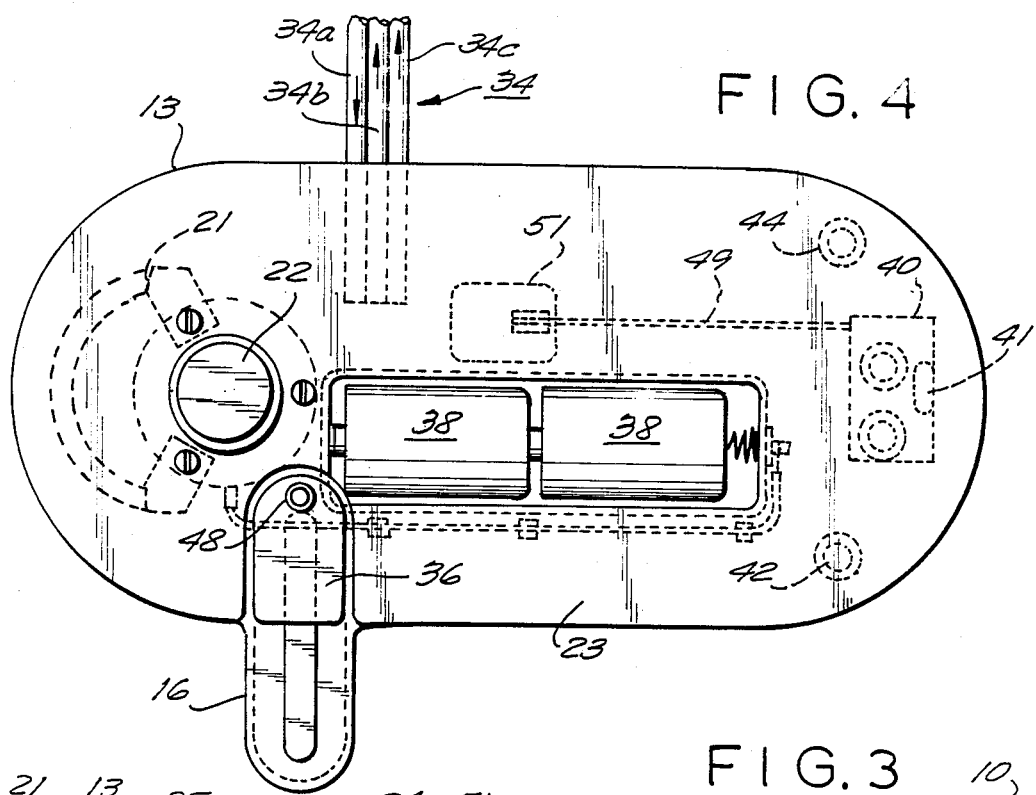
FIG. 4 is a top plan view of the unit shown in FIGS. 1-3.

A pushbutton switch 36 is provided in the top of the unit to operate the pump 22 to dispense water through the outlet spout 16. As it is shown in FIG. 4, a pair of light-emitting diodes (LED's) 48 is mounted in the body of the pushbutton 36. Also, as is shown in FIG. 2, a conductivity probe 46 is positioned in the output water feed line 47. An electrical circuit (FIG. 5) is activated by the pushing of the pushbutton switch, simultaneously with the operation of the pump motor 24, causing one of the LED pair 48 to glow with either a green or a red light, depending upon whether the conductivity of the water being pumped is greater than or less than a pre-determined value. This value is selected to provide the line of demarcation between water of acceptable purity and unacceptable purity. When the LED glows red, the user knows that the water purity is too low, and that he must either flush the reverse osmosis membrane 32, and/or change one or more of the filter elements 28 or 30, or must have the purifier unit serviced.

STRUCTURAL FEATURES

Referring to FIG. 3, each of the housing 12, the reservoir 20, the cover 13 and a pump mounting plate 19, is a separate element. Each preferably is a molded thermoplastic resin structure, the housing being made of ABS plastic, and the reservoir being made of polypropylene. The reservoir has the shape of the housing 12 and fits inside of the housing in telescopic fashion. The plate 19 is oval in shape to conform with the shape of the housing, and has an upturned flange portion 21 around the edge which provides a ledge which fits down onto the top edge of the reservoir 20. The pump 22 is mounted on the plate 19, and a recess 23 in the plate provides a cavity for a pair of batteries 38 connected in series. Actually, it is preferred to use four batteries to minimize the frequency of battery replacement. The cover 13 slides over the rim 21 of the plate 19, and over the top of the reservoir wall, as shown in FIG. 3. Compartment 23 also contains an integrated circuit chip 82 (FIG. 5) and circuitry used to measure the conductivity of the water being dispensed.

The space between the plate 19 and the top of the cover 13 is sealed against the incursion of water from within the reservoir 20. To this end, an O-ring seal 25 is provided to seal the mounting of the pump to the plate 19.

When it is desired to replace the batteries, the cover 13 is removed to give access to the batteries. When it is desired to remove the plate 19 and the pump 22, one removes the cover 13, grasps a handle 21 attached to the plate 19 and lifts the plate, pump and batteries, etc., out of the unit.

The pump 22 is a conventional centrifugal submersible pump.

The reservoir 20 has a bottom wall portion 26 (FIG. 3) which is deeper than the remainder 26a of the bottom wall. The inlet 27 of the pump 22 extends down into the deeper portion 26 of the reservoir. Thus, when the water level in the reservoir gets very low, the pump can still draw some water, almost to the point at which the water is completely depleted.

Referring now to FIG. 2, as well as FIG. 3, the prefilter 28, the postfilter 30, and the membrane module 32 are all cylindrically shaped and assembled together as shown. A central longitudinal rib 31 is provided in the portion 26a of the bottom of the reservoir 20. Curved projections 33 (see FIG. 3) extend downwardly from the bottom wall portion 26(a). The projections 33, and the projection 31 together form a curved receptacle for receiving and holding the post filter 30 and the pre filter 28 in position. A metal strap 29 encircles the three units 28, 30 and 32 and is attached at its ends by means of screws 37 to a pair of molded bosses 35. Thus, the filters and the reverse osmosis membrane unit are attached to the bottom of the reservoir, and when the reservoir is removed from the housing, those units come with it.

The reservoir and its attached filter units rests on three upstanding molded projections 39 and 41 in the bottom wall of the housing 12 (see FIG. 3). The projection 41 is a single projection aligned on the vertical center of the housing as it is shown in FIG. 2. The projection 41 mates with a projection 43 extending downwardly from the reservoir. Two of the projections 39 are provided, one of each on the left and right hand sides of the housing. Thus, the weight of the reservoir, the water in it, the filters, etc., is supported by three solid projections projecting upwardly from the base of the housing. Since the reservoir and its attached components merely rest upon the projections, the reservoir and the other parts are easy to remove from the housing for cleaning and servicing.

The float valve 40 shown in FIGS. 3 and 4 is attached to an arm 49 and the float 51. These components operate in a known way to turn off the input water to the unit when the reservoir is full. This prevents continuous flow of water into the device, thus wasting water and causing the membrane to need flushing more frequently, a persistent problem in prior counter-top reverse osmosis water purifiers.

The prefilter 28 and the postfilter 30 are conventional and will not be described in any detail here.

A suitable reverse osmosis membrane is, for example, one of many spiral-wound cellulose membranes available from different manufacturers. However, other types of known reverse osmosis membranes also can be used, if desired.

ELECTRICAL OPERATING CIRCUIT

Figure 5:
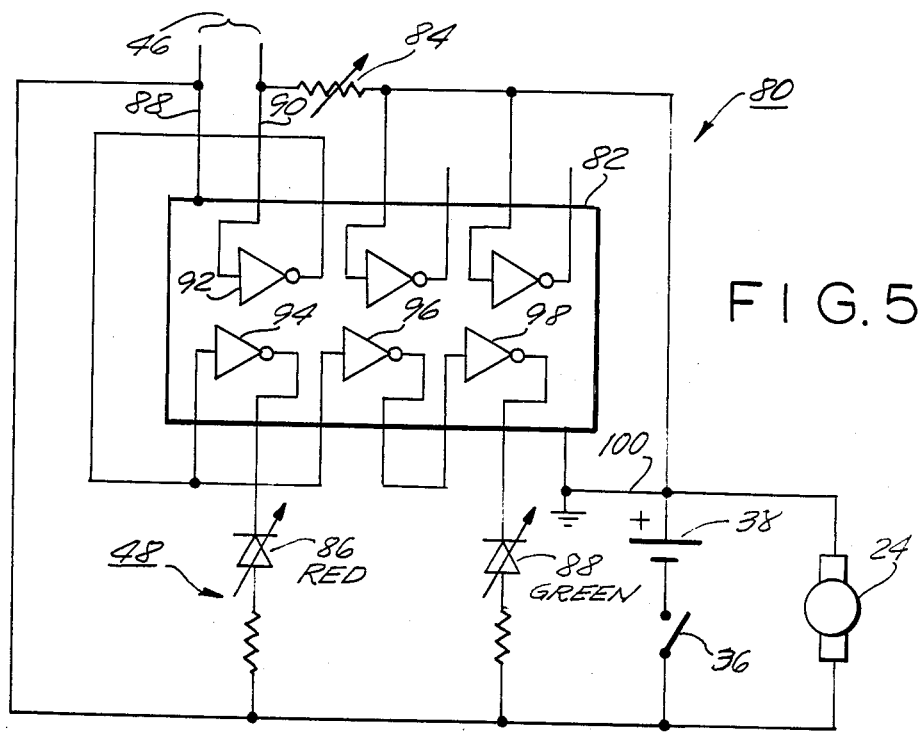
FIG. 5 is an electrical schematic circuit diagram of an operating circuit used with the device of the present invention.

FIG. 5 shows the electrical operating circuit 80 of the purifier device. The pushbutton switch 36 is connected in series with the batteries 38 which are connected in parallel with the pump motor 24 and the conductivity test circuit 80.

The conductivity test circuit 80 includes a conventional integrated circuit chip 82 containing a plurality of bistable inverting amplifiers 92, 94, 96, etc. The leads 88 and 90 from the conductivity probe 46 are connected to the input leads of one bistable amplifier 92 whose output is connected as shown to additional bistable amplifiers 94, 96 and 98 forming a part of the chip 82. The diode pair 48 consists of red light-emitting diode 86 and a green light-emitting diode 88 which are connected as shown in the circuit. An adjusting potentiometer 84 is connected as shown. By the adjusting the potentiometer 84, the level at which the red LED 86 is turned on and the green LED 88 is turned off is determined, thus setting the conductivity level of the water which is permitted.

The operation of the circuit 80 will not be described in great detail since it is well known. However, each bistable amplifier changes state when its input signal changes polarity. The resistor 84 and the resistance of the water as sensed by the test probe 46 together form a voltage divider network which changes the polarity of the input signal to the amplifier 92 when the water conductivity passes the pre-set level. This turns on the green LED and disable the red LED when the conductivity of the water is below the preset level, and turns on the red LED and disables the green LED when the conductivity is above the pre-set level. Each of the amplifiers has inherent hysteresis so that a "dead band" is provided to prevent "hunting" by the circuit when the water conductivity is near the pre-set level.

DIVERTER VALVE

Referring now to FIGS. 7-11, the diverter valve unit 50 includes a valve body 53 with internal threads 58 at its inlet end which are threaded onto the externally-threaded outlet end of the water faucet 52. An orifice selector valve member 68 is rotatably attached at the opposite end of the valve body 53 or a stud 72 on a retaining ring 73. An optional aerator 57 is threaded onto the externally threaded lower portion of the valve element 68. The aerator 57 is conventional and aerates the water passing through the diverter valve.

Referring to FIGS. 7, 8 and 9, extending outwardly from a flat recess 55 in the valve body 53 are three nipples 60, 62 and 64 onto each of which is attached one of the three hoses 34a, 34b and 34c which convey water to and from the water purifier unit 10. The hose 34a is connected to the nipple 60 and delivers water under pressure from the faucet to the purifier unit to be purified. Hose 34b is connected to the nipple 62 (FIG. 8) is the "brine" hose which conducts impurity-laden water from the purifier unit to drain; that is, into the sink 54 through the diverter valve 50. The hose 34c (FIG. 9) is connected to the nipple 64 and conducts overflow water from the reservoir of the purifier to drain.

Referring now to FIGS. 8 and 9, the diverter valve unit 50 is provided with a plunger 56 which is pulled outwardly to the position shown in FIG. 8 for operation of the water purifier unit, and is pushed inwardly to the position shown in FIG. 9 when it is desired to operate the faucet in the normal fashion to dispense water into the sink.

Water from the water faucet 52 flows through a hole 59 which extends parallel to but offset from the central axis of the cylindrical valve body. The hole 59 connects with a chamber 61 formed by a horizontal bore in the valve body. The nipple member 60 is force-fitted into the bore.

The plunger 56 includes a shaft 63 with a groove into which is fitted an O-ring 65. Threaded onto the external end of the shaft 63 is a knob 49. Threaded onto the other end of the shaft 63 is a piston member 67 with a O-ring seated in a circumferential groove. When the plunger 56 is in the position shown in FIG. 8, the piston 67 fits into the right-hand portion of the chamber 61 and permits water to flow under pressure from the faucet 52 in the direction indicated by the arrows and outwardly through the water feed hose 34a. The piston 67 prevents the flow through an outlet passageway 69. The O-rings forming a part of the plunger 56 prevent leakage.

Impurity-laden water returning through hose 34b passes downwardly through an outlet opening 71. In the position shown in FIG. 8, the valve member 68 is rotated to the "operate" position, in which a member 70 with a relatively small orifice blocks the outlet path of the brine opening. The orifice provides the proper amount of back pressure for efficient operation of the reverse osmosis membrane.

Referring now to FIG. 9, when the plunger 56 is pushed inwardly to the position shown in FIG. 9, the piston 67 is moved to a position in which it blocks the outlet to feed hose 34a and interconnects the inlet passageway 59 with the outlet passageway 69 to allow water to flow straight through from the faucet to the sink. The overflow line 34c always is connected to the passageway 69 to drain any excess water from the water purifier unit to the sink.

FIGS. 10 and 11 are bottom plan views of the rotary valve member 68 in two different operative positions. In FIG. 10, the valve member 68 is shown in the position indicated in FIG. 8 in which the orifice member 70 is aligned with the brine outlet passageway 71. FIG. 11 shows the member 68 rotated clockwise ninety degrees to a position in which an opening 78 is instead aligned with the brine outlet passageway 71. The diameter of the outlet opening 78 is much larger than that provided by the orifice member 70. In this position, the reverse osmosis membrane can be flushed and the water discharged from the flushing operation readily can flow out through the opening 78.

The member 68 has an arcuate slot 76. A pin 74 extends downwardly from the bottom of the valve body 53 and fits into the slot 76.

In the position shown in FIG. 10, the pin 74 abuts against the right end of the slot to provide proper alignment of the hole 78 with the outlet passageway 69. In the position shown in FIG. 11, the pin 74 abuts against the left end of the slot 76, while the right end of the slot 76 is aligned so as to open the passageway 69. Thus, the passageway 69 is open in both positions of the valve member 68.

The operation of the valve member 68 is advantageous in that it provides a relatively easy method for changing the size of the orifice in the brine drain path so as to change from normal operation to flushing operation when it is desired to flush the reverse osmosis membrane of the water purifier unit. This contrasts very favorably with prior art needle-valve members which have been used for the same purpose. Such valves are relatively difficult and time consuming to operate, and can be more delicate and more easily damaged.

By the use of the plunger 56, the diverter valve member can be threaded onto the end of the faucet 52 and left there over a long period of time without significantly disrupting the use of the faucet in the normal way; that is, the diverter valve simply can be left in place rather than having to be removed and re-attached frequently.

As it can be seen from the foregoing description, the water purifier device and method of the invention meets the objectives set forth above. The invention provides a compact, easy-to-use, relatively low-cost device which provides greater assurance of the purity of the water being dispensed. The dispensing of water into relatively tall containers is facilitated without making the purifier unit too tall. The use of automatic purity indicators not only quickly indicates the need for flushing and/or service, but also tells the user that the device is operating. The device conserves water and is convenient to use. The diverter valve used is easy to adjust and does not require frequent removal from the water faucet. The device and method have the other advantages mentioned above, and may have still others which have not yet been appreciated.

The above description of the invention is intended to be illustrative and not limiting. Various changes or modifications in the embodiments described may occur to those skilled in the art and these can be made without departing from the spirit or scope of the invention.

I claim:

1. A reverse osmosis water purifier comprising, in combination, a housing having a base adapted to rest upon a countertop, a reverse osmosis water purifier element mounted in said housing, a purified water reservoir mounted in said housing and connected to receive purified water from said purifier element, conduit means for conducting pressurized unpurified water to said purifier element, coupling means for coupling said conduit means to a water faucet outlet as a source of pressurized unpurified water, dispensing outlet means for said reservoir, said outlet means being located a substantial distance above the bottom wall of said reservoir, and pump means operable to pump purified water from said reservoir and out through said outlet.

2. A device as in claim 1 in which said housing has a top wall, said outlet means being located adjacent said top wall.

3. A device as in claim 1 in which said pump means is a submersible pump driven by an electrical motor and mounted in said reservoir.

4. A device as in claim 1 in which said pump means comprises a battery-driven pump, and battery mounting means for mounting at least one battery in said housing for driving said pump.

5. A device as in claim 1 in which said pump means comprises an electrical pump, switch means operable for selectively energizing said pump to dispense purified water, conductivity test means for testing the conductivity of said purified water and indicating whether said conductivity is above or below a pre-determined limit, said test means being operable by said switch means.

6. A device as in claim 5 in which said pump is battery-operated, means for mounting at least one battery in said housing and for connecting said switch means, said pump and said conductivity test means to said battery.

7. A device as in claim 2 in which said housing has substantially vertical side walls, said outlet means comprising a dispensing spout extending outwardly from and overhanging one of said side walls, whereby a relatively tall container can be placed on said countertop under said spout to receive said purified water dispensed therefrom.

8. A countertop reverse osmosis water purifier unit comprising a housing, a purified water reservoir shaped to nest within said housing, a submersible pump for pumping water out of said reservoir, a mounting plate for mounting said pump in said reservoir, said plate forming at least a partial cover over said reservoir.

9. A device as in claim 8 in which said plate has mounting means for mounting batteries and operating circuitry for said device, said plate being constructed so as to seal said reservoir from said mounting means, and a cover for covering said mounting means with space between said cover and said plate for housing said batteries and operating circuitry, and means for mounting a reverse-osmosis unit on said reservoir so that the reservoir and reverse osmosis units can be removed from said housing as a unit.

10. A reverse osmosis water purifier comprising, in combination, a housing having a base adapted to rest upon a countertop, a reverse osmosis water purifier element mounted in said housing, a purified water reservoir mounted in said housing and connected to receive purified water from said purifier element, conduit means for conducting pressurized unpurified water to said purifier element, coupling means for coupling said conduit means to a water faucet outlet as a source of pressurized unpurified water, dispensing outlet means for said reservoir, said outlet means being located a substantial distance above the bottom wall of said reservoir, electrical pump means operable to pump purified water from said reservoir and out through said outlet, switch means operable for selectively energizing said pump to dispense purified water, and conductivity test means for testing the conductivity of said purified water and indicating whether said conductivity is above or below a pre-determined limit, said test means being operable by said switch means.

11. A device as in claim 10 in which said switch means is located adjacent the top wall of said housing, said test means including indicator means closely adjacent said switch means, whereby said indicator means can be seen easily when said switch mean is operated.

12. A device as in claim 11 in which said indicator means includes red and green light emitting devices.

13. A device as in claim 11 in which said indicator means is mounted in the body of said switch means, and including a probe in contact with said purified water.

14. A device as in claim 10 including two different indicator elements, means for setting a desired conductivity level, and means for enabling one of said elements and disabling the other when said conductivity is below said desired level, and enabling said other indicator and disabling said one indicator when said conductivity is above said desired level.

15. A valve for diverting water from a faucet to a reverse osmosis water purifier unit, said valve including a valve body with means for connecting with said valve body with said faucet, said valve body having a feed outlet port for feeding pressurized water to said reverse-osmosis unit, a return inlet port communicating with a drain port in said body, a rotatable valve member rotatably mounted on said valve body, said valve member having orifices of selected sizes, the size of one of said orifices being relatively large for use during flushing of said reverse osmosis unit and the size of another orifice being relatively small and of a size to provide a suitable amount of back pressure for effective operation of said reverse-osmosis unit during water purification, said rotatable valve member being rotatable to align a selected one of said orifices with said drain port.

16. A valve as in claim 15 including a through port in said valve body for allowing water to go through said body, and a further valve member positionable in said valve body to selectively allow water from said faucet to flow out of said through port and to bypass said outlet port.

17. A valve as in claim 15 in which said valve body includes another inlet port communicating with said through port to provide an overflow drain for said reverse osmosis purifier unit.

18. A valve as in claim 16 in which said valve body has a faucet inlet and in which said further valve member comprises a plunger positionable in one position to occlude said feed outlet and connect said faucet inlet with said through port, and in another position to connect said faucet inlet with said feed outlet and occlude the connection of said faucet inlet with said through port.

19. A valve as in claim 15 in which the relatively small orifice is formed by means of an insert member fitted into a hole in said valve member, said insert having a relatively much smaller hole in it to form said orifice.

20. A device as in claim 1 in which said coupling means consists of a valve for diverting water from said faucet to said water purifier unit, said valve including a valve body for connection with a water faucet, said valve body having a feed outlet port for feeding pressurized water to said purifier unit, a return inlet port communicating with a drain port in said body, and a rotatable valve member rotatably mounted on said valve body, said valve member having orifices of selected sizes, the size of one of said orifices being relatively large for use during flushing of said purifier unit, and the size of another orifice being relatively small for use during water purification, said rotatable valve member being rotatable to align a selected one of said orifices with said drain port.

* * * * *